(12) United States Patent
Vincent et al.

(10) Patent No.: US 10,564,687 B2
(45) Date of Patent: Feb. 18, 2020

(54) FAN-LESS MODE IN A POWER OVER ETHERNET (POE) NETWORK DEVICE

(71) Applicant: Brocade Communications Systems, Inc., San Jose, CA (US)

(72) Inventors: Jean-Francois Vincent, Cupertino, CA (US); Michael Lee, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 187 days.

(21) Appl. No.: 15/714,856

(22) Filed: Sep. 25, 2017

(65) Prior Publication Data
US 2018/0120913 A1 May 3, 2018

Related U.S. Application Data

(60) Provisional application No. 62/414,582, filed on Oct. 28, 2016, provisional application No. 62/420,826, filed on Nov. 11, 2016.

(51) Int. Cl.
| | | |
|---|---|---|
| *G06F 1/20* | (2006.01) | |
| *G06F 1/3209* | (2019.01) | |
| *G06F 1/3287* | (2019.01) | |
| *G06F 1/26* | (2006.01) | |

(52) U.S. Cl.
CPC .............. *G06F 1/206* (2013.01); *G06F 1/266* (2013.01); *G06F 1/3209* (2013.01); *G06F 1/3287* (2013.01)

(58) Field of Classification Search
CPC . G06F 1/206; G06F 1/20; G06F 1/266; G06F 1/3203; G06F 1/3209; G06F 1/3287; Y02D 10/171

USPC .......................... 713/320, 300, 310; 700/300
See application file for complete search history.

(56) References Cited

U.S. PATENT DOCUMENTS

| | | | | |
|---|---|---|---|---|
| 6,259,172 B1 * | 7/2001 | Lee | .......................... | G06F 1/206 307/125 |
| 7,076,159 B2 * | 7/2006 | Bekker | ..................... | H02P 7/29 318/432 |
| 7,571,617 B2 * | 8/2009 | Inoue | ...................... | G06F 1/181 62/157 |
| 7,882,369 B1 * | 2/2011 | Kelleher | ............... | G06F 1/3203 713/300 |
| 7,890,219 B2 * | 2/2011 | Tuma | .................. | H05K 7/20209 700/300 |
| 8,761,956 B2 * | 6/2014 | Chen | .................. | H05K 7/20836 700/300 |
| 8,848,362 B1 * | 9/2014 | Che | .......................... | G05B 9/02 361/679.46 |
| 9,354,679 B2 * | 5/2016 | Gough | .................... | G06F 1/206 |
| 9,654,051 B2 * | 5/2017 | Yang | ...................... | H02P 27/08 |
| 2002/0101714 A1 * | 8/2002 | Osecky | .................. | G06F 1/206 361/679.48 |
| 2003/0011984 A1 * | 1/2003 | Chu | ....................... | G06F 1/206 361/679.48 |

(Continued)

*Primary Examiner* — Aurel Prifti
(74) *Attorney, Agent, or Firm* — Stewart M. Wiener

(57) ABSTRACT

Techniques for implementing a fan-less mode in a Power over Ethernet (PoE) network device are provided. According to one set of embodiments, the PoE network device can receive a user command to enable the fan-less mode. In response to the command, the PoE network device can (1) turn off the active cooling fans of the device, and (2) modify a PoE power budget of the device from a first amount to a second, reduced amount that is less than the first amount.

18 Claims, 2 Drawing Sheets

(56) References Cited

U.S. PATENT DOCUMENTS

| | | | |
|---|---|---|---|
| 2006/0006246 A1* | 1/2006 | Kim | F04D 27/004 236/49.3 |
| 2006/0178786 A1* | 8/2006 | Bhagwath | G05D 23/1917 700/300 |
| 2008/0065869 A1* | 3/2008 | Kim | G06F 1/3203 712/229 |
| 2008/0184047 A1* | 7/2008 | Goeltzenleuchter | G06F 1/206 713/320 |
| 2009/0249862 A1* | 10/2009 | Glover | G06F 1/20 73/30.04 |
| 2010/0023787 A1* | 1/2010 | Ho | G06F 1/206 713/320 |
| 2010/0117579 A1* | 5/2010 | Culbert | G06F 1/20 318/471 |
| 2012/0066525 A1* | 3/2012 | Tamura | G06F 1/20 713/310 |
| 2012/0319635 A1* | 12/2012 | Chang | H02P 29/60 318/472 |
| 2014/0245031 A1* | 8/2014 | Hamdi | G06F 11/3062 713/300 |
| 2014/0371924 A1* | 12/2014 | Kodama | G06F 1/20 700/276 |
| 2015/0212556 A1* | 7/2015 | Hrehor, Jr. | G06F 1/20 361/679.48 |
| 2016/0015167 A1* | 1/2016 | Abu-Akel | A47B 21/02 248/161 |
| 2016/0091938 A1* | 3/2016 | Edwards | G06F 1/206 700/300 |
| 2016/0187927 A1* | 6/2016 | MacDonald | G06F 1/1632 361/679.41 |
| 2016/0299545 A1* | 10/2016 | May | G06F 1/183 |
| 2018/0032114 A1* | 2/2018 | Hovis | G05B 15/02 |
| 2019/0121409 A1* | 4/2019 | Wu | G06F 21/35 |

* cited by examiner

FAN-LESS MODE IN A POWER OVER ETHERNET (POE) NETWORK DEVICE

CROSS-REFERENCES TO RELATED APPLICATIONS

The present application claims the benefit and priority of U.S. Provisional Application No. 62/414,582, filed Oct. 28, 2016, entitled "FAN-LESS MODE IN A NETWORK DEVICE," and U.S. Provisional Application No. 62/420,826, filed Nov. 11, 2016, entitled "FAN-LESS MODE IN A NETWORK DEVICE." The entire contents of these provisional applications are incorporated herein by reference in their entireties for all purposes.

BACKGROUND

Ethernet network devices, such as network switches and routers, can be classified as data-only devices or data+Power over Ethernet (PoE) devices. A data-only Ethernet network device transfers only data over its Ethernet ports. On the other hand, a data+PoE Ethernet network device (referred to herein as a PoE network device) can transfer both data and power over its Ethernet ports to endpoint devices. In the scenario where a PoE network device acts as a source of power for a given endpoint device, the PoE network device is said to be a PSE (power supplying equipment) and the endpoint device is said to be a PD (powered device). By providing power directly to PDs over Ethernet, PoE network devices can advantageously eliminate the power cabling requirements for such PDs and allow the PDs to be installed at locations that do not have a nearby electrical outlet.

When a PoE network device acts as a PSE for a PD, it takes power from a source (e.g., a power supply connected to the electrical grid or a battery/generator/uninterruptible power supply (UPS)) and supplies the power to the PD over the Ethernet cable to which the PD is attached. In doing this, the PoE network device does not consume more power for its own operation; instead, it transfers the power to the PD. However, this transfer of power is not perfect and is subject to energy losses (mostly within the PoE network device). Typically, 10-25% of the energy drawn by the PoE network device for transfer to PDs is lost during the transfer process. This lost energy is dissipated as heat at the PoE network device. As a result, PoE network devices need to be engineered to dissipate significantly more heat than data-only network devices.

For example, consider an Ethernet switch that comprises 48 ports. Assume that a data-only version of this switch consumes a maximum of 250 watts. In this case, the switch's mechanical and thermal design will be crafted to ensure that the switch can dissipate 250 watts under normal operating conditions.

Now consider a PoE version of the 48-port switch that is configured to deliver 30 watts of power on each switch port. In this case, the switch needs to be able to dissipate the 250 watts consumed for its own operation, as well as the energy losses arising from acting as a PSE for the 48 ports at 30 watts each. These energy losses amount to approximately 48 ports×(30 watts×25%)=360 watts. Thus, for the same 48-port switch, the PoE version needs to be able to dissipate an additional 360 watts over the data-only version.

There are two ways in which a network device can dissipate heat and thereby cool itself: passive cooling and active cooling. With passive cooling, there are no active subsystems (e.g., fans, air conditioners, water pumps, etc.) for dissipating heat from the device; instead, the device is cooled purely by conduction and natural convection. This cooling approach is more reliable than active cooling since there are no moving parts that can fail or break. However, passive cooling generally requires a large device chassis (to promote passive air circulation) and expensive, large-surface area heatsinks, which can significantly increase the size and cost of the device.

In an actively cooled network device, there are typically one or more fans that push/pull air from outside the device to cool the device interior and/or one or more fans that expel hot air from inside the device to the exterior. This allows for higher power density than passive cooling, since the fans provide for significantly more air flow/circulation than possible via natural convection. Thus, for the same number of ports, an actively cooled network device will generally be much smaller (and usually less costly) than a passively cooled network device. However, active cooling also has a number of disadvantages. For example, the fans used to cool the network device must be powered, which increases the power consumption of the device. Further, fans are often very noisy, which can be problematic or unacceptable if the device is deployed in or near an environment where "quiet" is important (e.g., a hotel room, conference room, class room, etc.). Yet further, since fans are mechanical components, they are guaranteed to fail after some period of time. When such active cooling equipment fails, this usually leads to a catastrophic device failure. Thus, the service life and mean time between failures (MTBF) of an actively cooled device are less than that of a passively cooled device. Finally, fans often pull contaminants, such as dust, into the device interior. This can reduce the efficiency of the cooling subsystem over time and, in some cases, can accelerate failure of the device.

SUMMARY

Techniques for implementing a fan-less mode in a Power over Ethernet (PoE) network device are provided. According to one set of embodiments, the PoE network device can receive a user command to enable the fan-less mode. In response to the command, the PoE network device can (1) turn off the active cooling fans of the device, and (2) modify a PoE power budget of the device from a first amount to a second, reduced amount that is less than the first amount.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
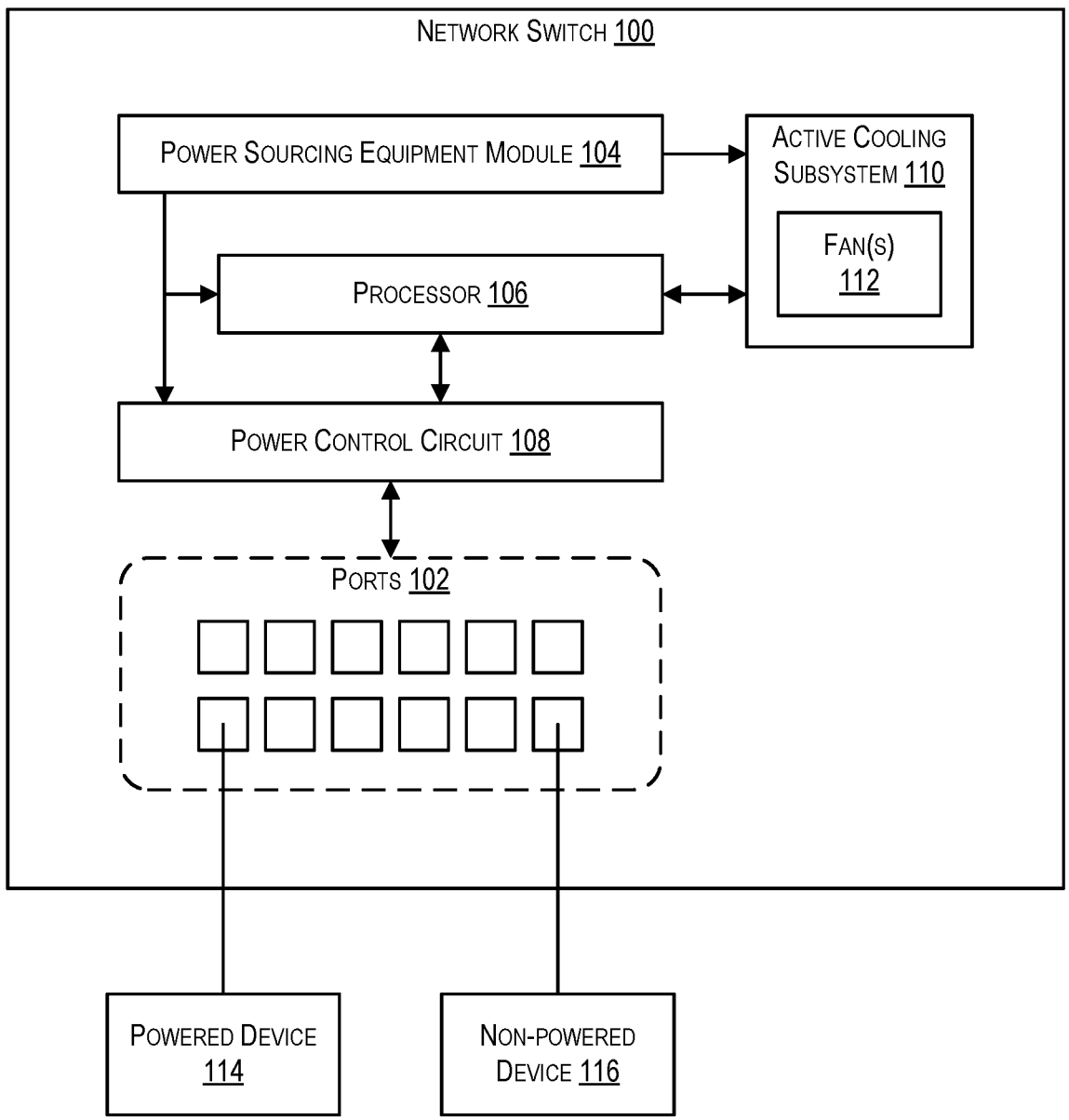
FIG. 1 depicts a PoE network device according to certain embodiments.

FIG. 1 is a simplified block diagram of a PoE network device (in this example, a network switch 100) in which embodiments of the present disclosure may be implemented. As shown, switch 100 includes a plurality of ports 102, a power sourcing equipment module (e.g., power supply) 104, a processor 106, a power control circuit 108, and an active cooling subsystem 110 comprising one or more fans 112.

Ports 102 are used to transfer data and power from switch 100 to one or more powered devices (PDs) 114, as well as transfer data alone to one or more non-powered devices 116. This data and/or power is transferred over Ethernet cables that interconnect ports 102 with each of devices 114/116 respectively. PDs 114 are configured to operate using the power supplied by switch 100; examples of such PDs include, e.g., IP telephones (which typically draw around 7 watts of PoE power), Wi-Fi access points (which may draw anywhere from 15 to 30 watts of PoE power), IP surveillance cameras, etc. On the other hand, non-powered devices 116 are configured to operate using power received from a separate power supply, such as a conventional 120 volt AC outlet or an internal battery; examples of such non-powered devices include, e.g., desktop computers, laptop computers, media streaming devices, etc.

Processor 106 is configured to manage and control the general operation of switch 100, including its PoE functions/capabilities. For example, processor 106 can receive/store the power capacity of power sourcing equipment module 104 and provide instructions to power control circuit 108 for delivering PoE power from module 104 to each port 102. Power control circuit 108 can implement the power-related instructions received from processor 106, as well as monitor the status of ports 102 and communicate with PDs 114 and non-powered devices 116. For instance, power control circuit 108 can detect when a powered or non-powered device has connected to a given port, determine the power requirements/limits of each PD, enable or disable power delivery to selected ports as instructed by processor 106, detect overload conditions, and so on.

Active cooling subsystem 110 is configured to regulate, using fans 112, the flow of air into and/or out of switch 100 so that the switch can adequately dissipate the heat that it generates. For instance, in one set of embodiments, active cooling system 110 can monitor the incoming (inlet) air temperature, the outgoing (outlet) air temperature, and the current air pressure (i.e., barometric reading) within/around switch 100. Based on these sensor readings and a predefined fan profile, active cooling subsystem 110 can modulate the speeds of fans 112 accordingly. For example, if the load on switch 100 increases/the ambient air temperature increases/the air pressure decreases, active cooling subsystem 110 can increase fan speeds, thereby increasing air flow within the switch and dissipating more heat. Conversely, if the load on switch 100 decreases/the ambient air temperature decreases/the air pressure increases, actively cooling subsystem 110 can decrease fan speeds, thereby decreasing air flow within the switch and reducing fan noise/wear. Generally speaking, active cooling subsystem 110 can perform this fan speed modulation with the goal of dissipating enough heat from switch 100 to keep the switch "cool enough" for its rated environmental operating conditions (e.g., up to X degrees and up to Y feet of elevation).

As noted in the Background section, the amount of heat that needs to be dissipated in a PoE network device such as switch 100 of FIG. 1 is significantly higher than the amount of heat that needs to be dissipated in a data-only version of the same device, due largely to energy losses arising from the PoE power transfer process. This means that the fans of active cooling subsystem 110 must work harder within switch 100 to keep the switch's internal temperature at an acceptable level (when compared to a non-PoE switch), which exacerbates all of the drawbacks of active cooling (e.g., noise, likelihood of fan/device failures, contaminant intrusion, etc.). It is possible to replace active cooling subsystem 110 with a passive cooling subsystem comprising a number of large heat sinks, but such passive cooling will generally increase the size and cost of switch 100 by a considerable amount.

To address the foregoing and other similar issues, switch 100 can be enhanced to support a novel "fan-less" mode in certain embodiments. When network switch 100 is not in fan-less mode, active cooling subsystem 110 can operate as normal—in other words, subsystem 110 can monitor the inlet temperature/outlet temperature/air pressure of switch 100 and modulate the speed of fans 112 in accordance with those readings and a fan profile. In addition, switch 100 can provide full PoE power on all of its ports 102 to PDs as needed. For example, if switch 100 has twelve ports as shown and is designed to provide up to 30 watts of PoE power per port, the switch can operate with a full PoE power budget 12 ports×30 watts=360 watts while not in fan-less mode.

However, when switch 100 is placed in fan-less mode, switch 100 can disable fans 112 such that they no longer run (i.e., their rotations per minute (RPM) is forcibly set to zero). Further, switch 100 can modify its PoE power budget from its normal full amount to a reduced amount. In various embodiments, this reduced PoE power budget will be predefined by the device manufacturer and will be set to a level that ensures switch 100 can dissipate enough heat to operate correctly in its rated environmental operating conditions without any active cooling (i.e., guaranteeing that switch 100 will never need to use fans 112 for cooling and can rely solely on whatever passive cooling elements are in the switch).

Then, upon setting the reduced PoE power budget, switch 100 can deny requests for PoE power from PDs on certain ports (or stop providing PoE power on certain ports) in order to enforce the reduced budget. This ensures that switch 100 can dissipate enough heat to continue operating under its rated environmental conditions without problems, even though fans 112 have been turned off. Note that while switch 100 may disable PoE power to one or more ports 102 in fan-less mode, in various embodiments the switch can continue to transfer data on all ports to non-powered devices while in this mode.

With the general approach described above, a number of benefits can be achieved. First, by having the ability to enable fan-less mode, users can flexibly repurpose an actively cooled PoE network device such as switch 100 as a passively cooled device for use in environments where quiet operation is of paramount importance (e.g., hotel room, meeting/conference room, etc.). This is significant because, in many cases, a pure passively cooled device may be cost prohibitive or may not fit within the space constraints of the environment. In certain embodiments, fan-less mode can be implemented in such a way that the device's fans will never turn on while this mode is enabled (described in further detail below), thereby ensuring that fan noise will never be generated.

Second, fan-less mode enables users to mitigate other drawbacks associated with active cooling for use cases where PoE power may not be needed on all ports of a PoE network device. For example, consider a scenario where a user deploys switch 100 of FIG. 1 in an environment where noise is not an issue, but where only a few endpoint devices require or can make use of PoE power. In this scenario, the user may choose to enable fan-less mode in order to, e.g., reduce the power draw of the switch, increase the switch's longevity (by avoiding wear and tear on active cooling subsystem 110/fans 112), and/or reduce the intrusion of dust into the switch. If switch 100 is later redeployed to another environment where PoE power is needed on all of its ports, the user can simply disable fan-less mode at that time.

It should be appreciated that FIG. 1 is illustrative and not intended to limit embodiments of the present disclosure. For instance, although FIG. 1 depicts a network switch as an example, the techniques of the present disclosure may be implemented in any type of network device known in the art (e.g., router, mid-span power injector, etc.) that can deliver power over Ethernet and that includes an active cooling subsystem. Further, although not explicitly shown, processor 106 may be communicatively coupled with an internal or external memory that is configured to store instructions and/or data for carrying out the techniques described herein. Alternatively, these instructions/data may be disposed in a mid-span device that resides between switch 100 and PDs 114; in this case, switch 100 may be a data-only device and the mid-span device may be configured to provide power to PDs 114.

Further, although FIG. 1 depicts switch 100 as a stand-alone network device, in certain embodiments the fan-less mode techniques of the present disclosure may be implemented in network devices that are part of a network stacking system or extended bridge. In these embodiments, the fan-less mode for one or more stack members may be enabled or disabled via command(s) that are entered at the master/active unit of the stack. One of ordinary skill in the art will recognize other variations, modifications, and alternatives.

Figure 2:
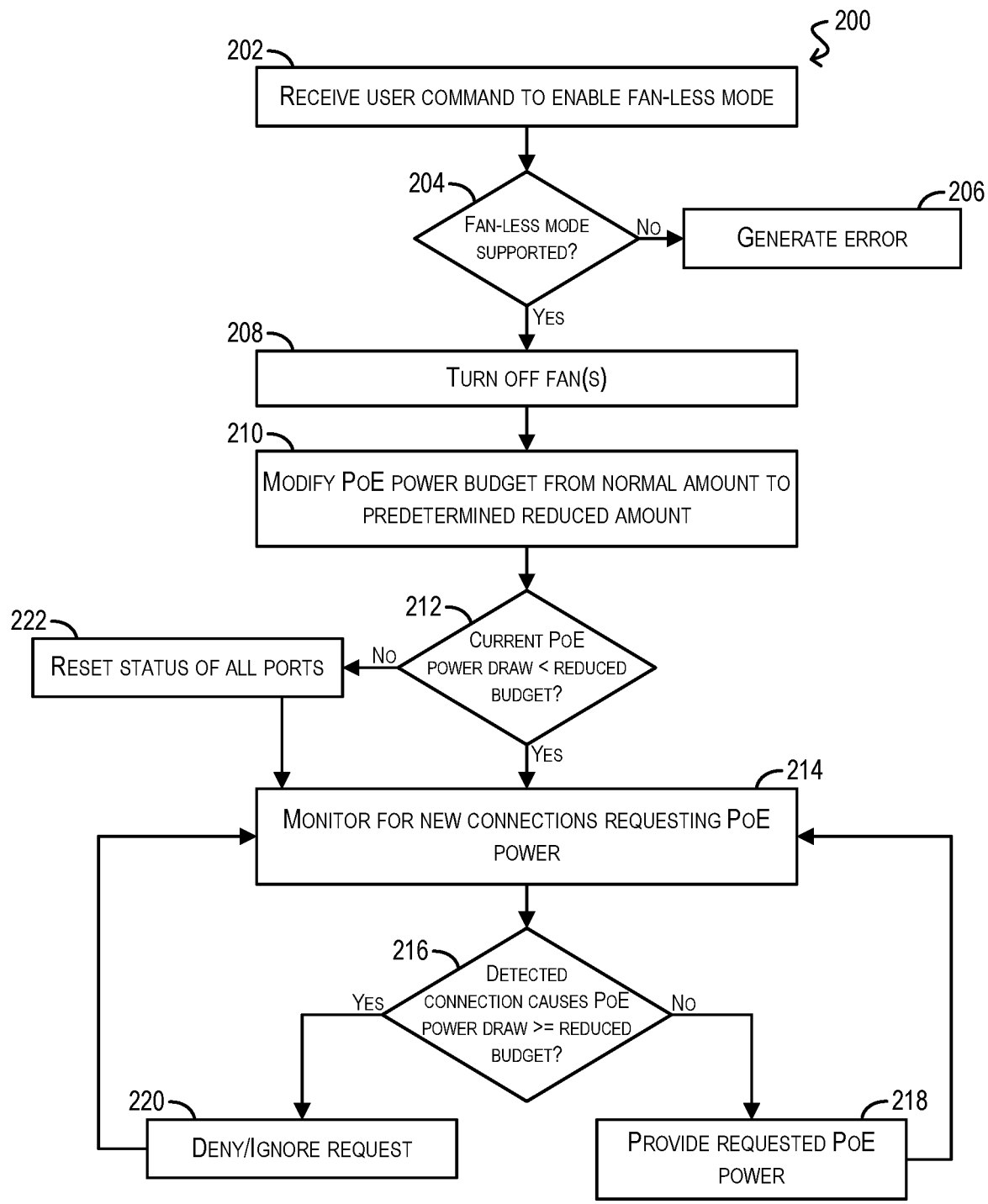
FIG. 2 depicts a flowchart for implementing fan-less mode in the PoE network device of FIG. 1 according to certain embodiments.

FIG. 2 is a flowchart 200 that details the steps that can be carried out by processor 106 of switch 100 for implementing fan-less mode according to certain embodiments. Flowchart 200 assumes that switch 100 is currently operating in its normal, active cooling mode (i.e., not in fan-less mode) and thus has a normal PoE power budget that enables the switch to supply PoE power on all of its ports.

Starting with block 202, processor 106 can receive a user command indicating that a user wishes to enable fan-less mode for switch 100. In one set of embodiments, this user command may take the form of a command-line interface (CLI) command that the user enters locally via a management console of switch 100. Alternatively, as mentioned above, in the scenario where switch 100 is a member of a stacking system, the user command may be entered at the master/active unit of the stack and may be communicated from that master/active unit to switch 100. In this stacking scenario, the user can specify the unit ID of switch 100 in the command or can specify that fan-less mode should be enabled for all stack members.

At block 204, processor 106 can check whether switch 100 is configured to support fan-less mode. If not, processor 106 can generate an error (block 206) and the flowchart can end.

If switch 100 is configured to support fan-less mode, processor 106 can turn off/disable fans 112 (block 208) and can modify the PoE power budget for switch 100 from its normal amount to a predefined reduced amount (block 210). As noted previously, this predefined reduced amount corresponds to a wattage number that switch 100 can passively dissipate (in addition to its own operational wattage) under its rated environmental operating conditions. For example, assume that the normal PoE power budget for switch is 360 watts (meaning that, with active cooling, the switch can dissipate up to 360 watts×25%=90 watts of PoE power loss), but when fans 112 are turned off the switch can only dissipate up 30 watts of PoE power loss. In this case, the PoE budget will be reduced to 4×30=120 watts. This specific number can be determined by the device manufacturer via laboratory simulation/testing and programmed into the software/firmware of switch 100.

Once processor 106 has reduced the switch's PoE power budget at block 210, processor 106 can check whether the current PoE power draw of switch 100 is less than the reduced budget (block 212). If so, processor 106 can monitor for new device connections that request PoE power (block 214) and, upon detecting such a connection, can further check whether the requested PoE power amount for the new connection would cause the switch's PoE power draw to exceed the reduced budget (block 216). If not, processor 106 can instruct power control circuit 108 to provide the requested PoE power on the appropriate port (block 218) and return to block 214. If yes, processor 106 can deny/ignore the request for PoE power (block 220) and return to block 214.

On the other hand, if processor 106 determines that the current PoE power draw of switch 100 is greater than or equal to the reduced budget at block 212, the processor can reset the status of all ports 102, thereby causing any devices connected to the ports to reattempt connection (block 222). In some cases, this may involve rebooting switch 100. Alternatively, in embodiments where ports 102 are categorized according to different priorities (e.g., low, high, etc.), processor 106 can shed (cut power) to lower priority ports/devices until the total power allocated is less than or equal to the reduced PoE power budget.

Processor 106 can then proceed to the monitoring step of block 214 so that it can evaluate new requests for PoE power on a first-come, first-serve basis, and processor 106 can subsequently iterate blocks 214-220 until it receives an explicit user command (e.g., CLI command) to disable fan-less mode and return to normal mode. Note that in FIG. 2, processor 106 never turns fans 112 back on while in fan-less mode (even if the internal temperature of switch 100 climbs beyond an acceptable level due to, e.g., changes in ambient temperature or elevation). In the situation where switch 100's passive cooling is not enough to keep the switch within its operating temperature range, processor 106 can reboot the switch. This will cause switch 100 to stop providing PoE power on all ports and reduce its CPU usage to a level that should, at least temporarily, cool down the switch to an acceptable level.

It should be appreciated that flowchart 200 is illustrative and various modifications and enhancements are possible. For example, rather than using a single, "worst-case" reduced PoE power budget when fan-less mode is on (i.e., a PoE power budget that allows the device to be passively cooled at its highest rated ambient operating temperature), in some embodiments processor 106 can dynamically reduce or increase the PoE power budget based on the current ambient temperature. Like the worst-case reduced power budget, the specific nature of this mechanism (i.e., the function that specifies power budget for a given ambient temperature) can be predetermined by the device manufacturer based on laboratory simulation/testing. With this enhancement, switch 100 can advantageously provide more or less PoE power based on changing environmental conditions.

One complication with changing the PoE power budget based on ambient temperature is that switch 100 may have to shed (i.e., cut) power to one or more PDs when the ambient temperature goes up and the PoE power budget goes down. To mitigate the unpredictability that this can cause, in certain embodiments switch 100 can allow a user to assign priorities to ports or groups of ports on the switch (as mentioned above). Using these user-defined priorities, switch 100 can cut power to the ports that are lower priority first in cases where power load needs to be shed, thereby avoiding an unexpected loss of power to important PDs that are connected to higher priority ports.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method performed by a Power over Ethernet (PoE) network device comprising a plurality of ports and one or more active cooling fans, the method comprising:
   receiving a user command to enable a fan-less mode; and
   in response to the user command:
     turning off the one or more active cooling fans; and
     modifying a PoE power budget of the PoE network device from a first amount to a second amount that is less than the first amount, wherein the first amount corresponds to a first number of watts that the PoE network device can deliver to the plurality of ports while adequately dissipating heat generated from delivering the first number of watts using the one or more active cooling fans, and wherein the second amount corresponds to a second number of watts that the PoE network device can deliver to the plurality of ports while adequately dissipating heat generated from delivering the second number of watts using only passive cooling elements.

2. The method of claim 1 wherein the second amount is predetermined by a manufacturer of the PoE network device.

3. The method of claim 1 further comprising, if a current PoE power draw of the PoE network device is less than the second amount:
   monitoring for new endpoint device connections that request PoE power;
   upon detecting a new endpoint device connection that requests PoE power, determining whether acceptance of the request would cause the current PoE power draw to exceed the second amount;
   if acceptance of the request would not cause the current PoE power draw to exceed the second amount, providing the requested PoE power; and
   if acceptance of the request would cause the current PoE power draw to exceed the second amount, denying or ignoring the request.

4. The method of claim 3 further comprising, if the current PoE power draw of the PoE network device is greater than or equal to the second amount:
   resetting the plurality of ports, thereby causing any endpoint devices connected to the plurality of ports to re-attempt connection.

5. The method of claim 1 further comprising:
   dynamically modifying the second amount based on a current ambient temperature around the PoE network device.

6. The method of claim 1 further comprising:
   receiving a user command to disable the fan-less mode; and
   in response to the user command to disable the fan-less mode:
     turning the one or more active cooling fans back on; and
     restoring the PoE power budget from the second amount to the first amount.

7. A non-transitory computer readable storage medium having stored thereon program code executable by a Power over Ethernet (PoE) network device comprising a plurality of ports and one or more active cooling fans, the program code causing the PoE network device to:
   receive a user command to enable a fan-less mode; and
   in response to the user command:
     turn off the one or more active cooling fans; and
     modify a PoE power budget of the PoE network device from a first amount to a second amount that is less than the first amount, wherein the first amount corresponds to a first number of watts that the PoE network device can deliver to the plurality of ports while adequately dissipating heat generated from delivering the first number of watts using the one or more active cooling fans, and wherein the second amount corresponds to a second number of watts that the PoE network device can deliver to the plurality of ports while adequately dissipating heat generated from delivering the second number of watts using only passive cooling elements.

8. The non-transitory computer readable storage medium of claim 7 wherein the second amount is predetermined by a manufacturer of the PoE network device.

9. The non-transitory computer readable storage medium of claim 7 wherein the program code further causes the PoE network device to, if a current PoE power draw of the PoE network device is less than the second amount:
   monitor for new endpoint device connections that request PoE power;
   upon detecting a new endpoint device connection that requests PoE power, determine whether acceptance of the request would cause the current PoE power draw to exceed the second amount;
   if acceptance of the request would not cause the current PoE power draw to exceed the second amount, provide the requested PoE power; and
   if acceptance of the request would cause the current PoE power draw to exceed the second amount, deny or ignore the request.

10. The non-transitory computer readable storage medium of claim 9 wherein the program code further causes the PoE network device to, if the current PoE power draw of the PoE network device is greater than or equal to the second amount:
    reset the plurality of ports, thereby causing any endpoint devices connected to the plurality of ports to re-attempt connection.

11. The non-transitory computer readable storage medium of claim 7 wherein the program code further causes the PoE network device to:
    dynamically modify the second amount based on a current ambient temperature around the PoE network device.

12. The non-transitory computer readable storage medium of claim 7 wherein the program code further causes the PoE network device to:
    receive a user command to disable the fan-less mode; and
    in response to the user command to disable the fan-less mode:
        turn the one or more active cooling fans back on; and
        restore the PoE power budget from the second amount to the first amount.

13. A Power over Ethernet (PoE) network device comprising:
    a plurality of ports;
    one or more active cooling fans;
    a processor; and
    a memory having stored thereon instructions that, when executed by the processor, cause the processor to:
    receive a user command to enable a fan-less mode; and
    in response to the user command:
        turn off the one or more active cooling fans; and
        modify a PoE power budget of the PoE network device from a first amount to a second amount that is less than the first amount, wherein the first amount corresponds to a first number of watts that the PoE network device can deliver to the plurality of ports while adequately dissipating heat generated from delivering the first number of watts using the one or more active cooling fans, and wherein the second amount corresponds to a second number of watts that the PoE network device can deliver to the plurality of ports while adequately dissipating heat generated from delivering the second number of watts using only passive cooling elements.

14. The PoE network device of claim 13 wherein the second amount is predetermined by a manufacturer of the PoE network device.

15. The PoE network device of claim 13 wherein the instructions further cause the processor to, if a current PoE power draw of the PoE network device is less than the second amount:
    monitor for new endpoint device connections that request PoE power;
    upon detecting a new endpoint device connection that requests PoE power, determine whether acceptance of the request would cause the current PoE power draw to exceed the second amount;
    if acceptance of the request would not cause the current PoE power draw to exceed the second amount, provide the requested PoE power; and
    if acceptance of the request would cause the current PoE power draw to exceed the second amount, deny or ignore the request.

16. The PoE network device of claim 15 wherein the instructions further cause the processor to, if the current PoE power draw of the PoE network device is greater than or equal to the second amount:
    reset the plurality of ports, thereby causing any endpoint devices connected to the plurality of ports to re-attempt connection.

17. The PoE network device of claim 13 wherein the instructions further cause the processor to:
    dynamically modify the second amount based on a current ambient temperature around the PoE network device.

18. The PoE network device of claim 13 wherein the instructions further cause the processor to:
    receive a user command to disable the fan-less mode; and
    in response to the user command to disable the fan-less mode:
        turn the one or more active cooling fans back on; and
        restore the PoE power budget from the second amount to the first amount.

\* \* \* \* \*